United States Patent
Zhang et al.

(10) Patent No.: US 11,965,772 B2
(45) Date of Patent: Apr. 23, 2024

(54) CALIBRATION DEVICE FOR WEIGHING SYSTEM

(71) Applicants: Mettler Toledo Precision Instrument Company Limited, Changzhou (CN); Mettler Toledo Measurement Technology Company Limited, Changzhou (CN); Mettler-Toledo International Trading (Shanghai) Co., Ltd., Shanghai (CN)

(72) Inventors: Haitao Zhang, Changzhou (CN); Chunhui Li, Changzhou (CN); Ping Zhang, Changzhou (CN); Chenggang Ding, Changzhou (CN); Tom Leahy, Castelsarrasin (FR)

(73) Assignees: Mettler Toledo Precision Instrument Company Limited, Changzhou (CN); Mettler Toledo Measurement Technology Company Limited, Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 608 days.

(21) Appl. No.: 17/265,560

(22) PCT Filed: Jan. 23, 2019

(86) PCT No.: PCT/CN2019/072820
§ 371 (c)(1),
(2) Date: Feb. 3, 2021

(87) PCT Pub. No.: WO2020/057034
PCT Pub. Date: Mar. 26, 2020

(65) Prior Publication Data
US 2021/0239514 A1   Aug. 5, 2021

(30) Foreign Application Priority Data

Sep. 18, 2018  (CN) .......................... 201811088894.9

(51) Int. Cl.
*G01G 23/01* (2006.01)
*G01G 23/18* (2006.01)

(52) U.S. Cl.
CPC ............. *G01G 23/01* (2013.01); *G01G 23/18* (2013.01)

(58) Field of Classification Search
None
See application file for complete search history.

(56) References Cited

U.S. PATENT DOCUMENTS

| 4,658,921 A | 4/1987 | Karpa |
| 10,794,754 B2 * | 10/2020 | Tomita ................... G01G 19/08 |
| 2017/0089753 A1 * | 3/2017 | Otaki ...................... G01F 25/14 |

FOREIGN PATENT DOCUMENTS

| CN | 1768252 A | 5/2006 |
| CN | 2861988 Y | 1/2007 |

(Continued)

*Primary Examiner* — Peter J Macchiarolo
*Assistant Examiner* — Jermaine L Jenkins
(74) *Attorney, Agent, or Firm* — Standley Law Group LLP; Jeffrey S. Standley; Adam J. Smith

(57) ABSTRACT

A calibration device is provided for a weighing system that has a tank with a plurality of support legs at a lower part thereof. The calibration device has at least one calibration module, a hydraulic system and a calibration terminal. An upper end of each calibration module is connected to an upper part of a corresponding support leg. A lower end of each calibration module is fixed to a foundation. A hose connects each calibration module to the hydraulic system for applying a force to the tank. The calibration terminal, connected to each calibration module, displays in real-time, the force applied to the tank. The calibration device can (Continued)

greatly improve the production efficiency, and in use, takes only two hours to complete the calibration, which is faster than the test weight and other calibration methods.

11 Claims, 4 Drawing Sheets

(56) References Cited

FOREIGN PATENT DOCUMENTS

| | | | |
|---|---|---|---|
| CN | 101387539 | A | 3/2009 |
| CN | 201434723 | Y | 3/2010 |
| CN | 203323858 | U | 12/2013 |
| GB | 2027542 | A | 2/1980 |

* cited by examiner

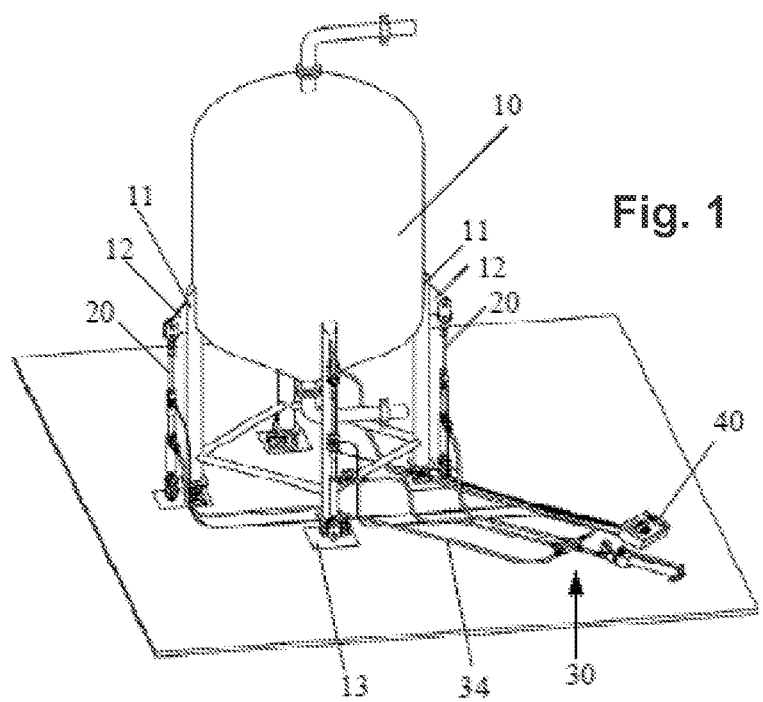
Fig. 1
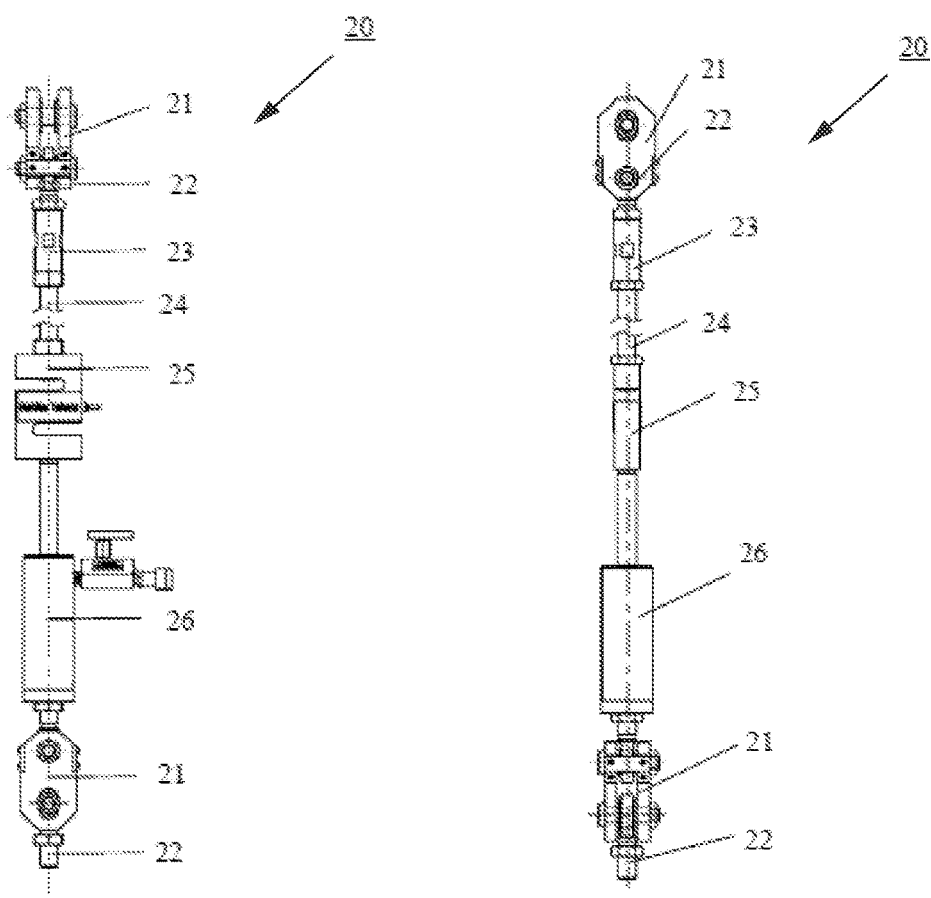
Fig. 2                              Fig. 3

Fig. 6
*(Prior Art)*
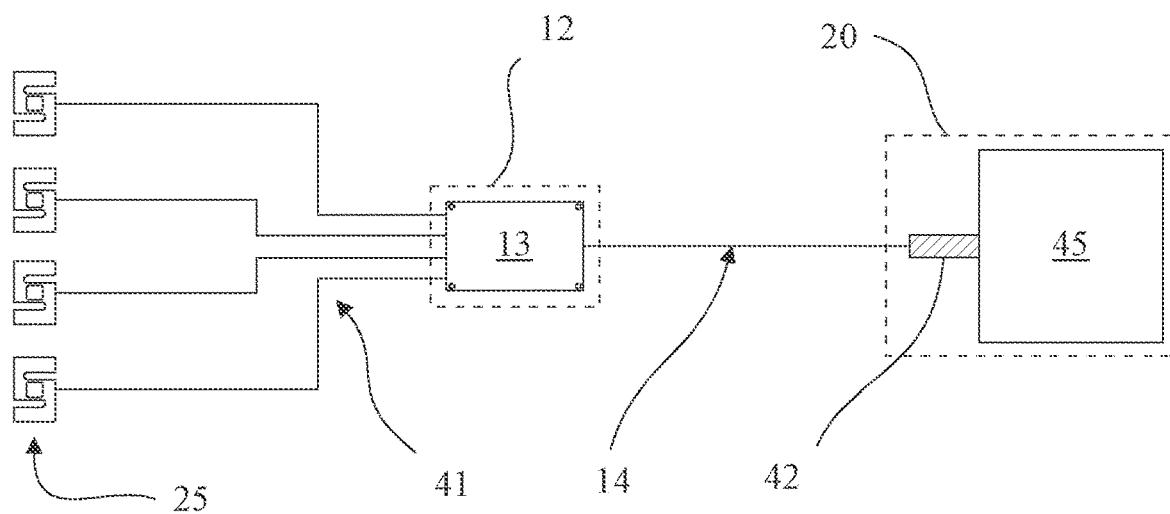
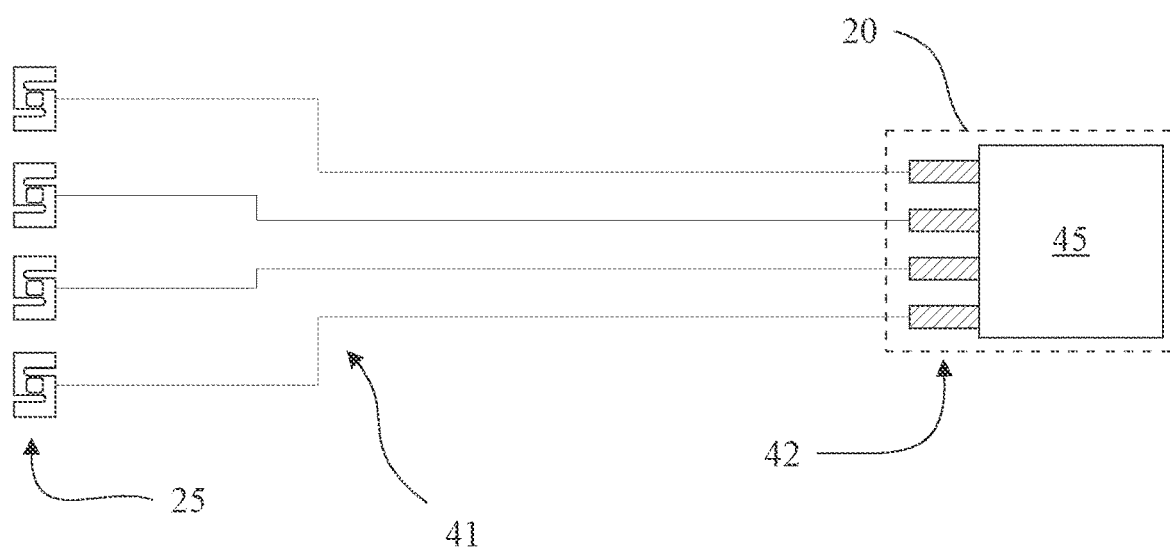
Fig. 7

Fig. 8
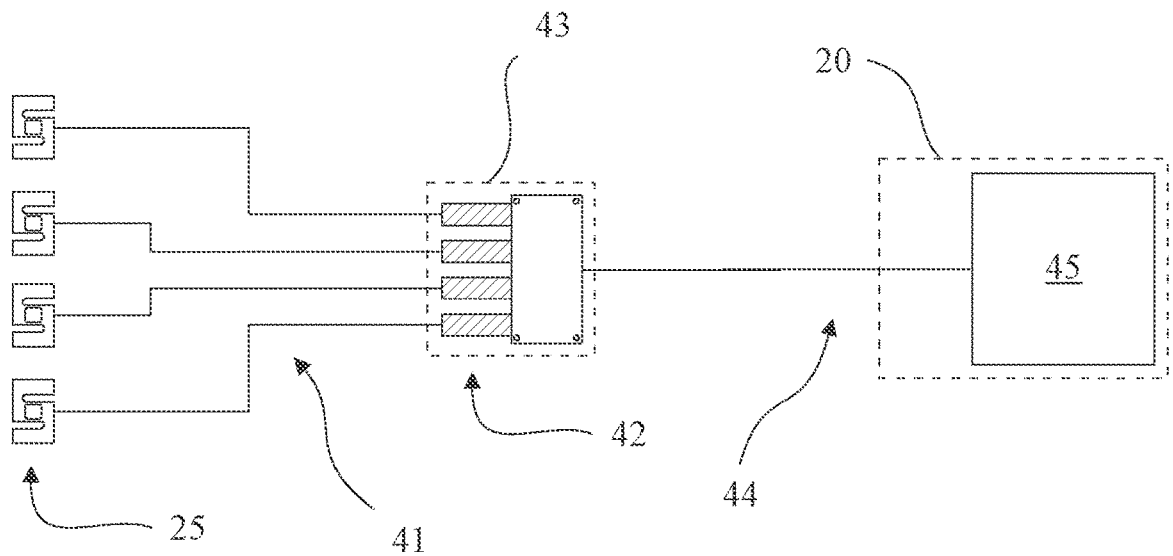
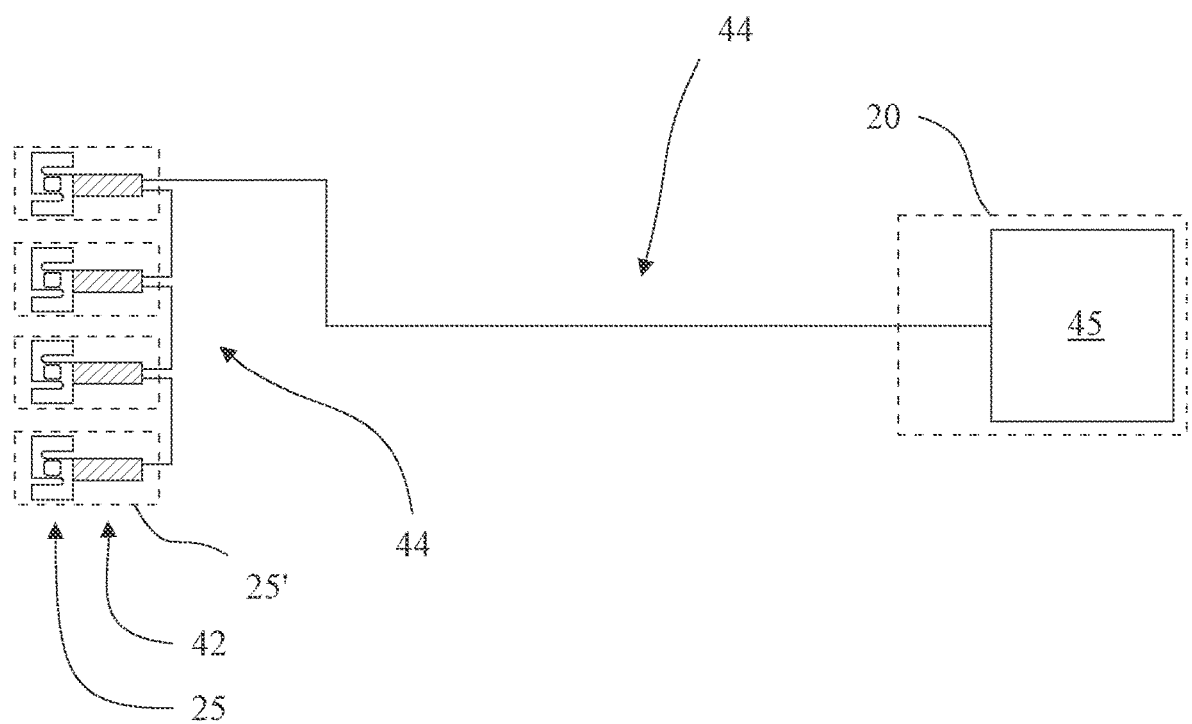
Fig. 9

CALIBRATION DEVICE FOR WEIGHING SYSTEM

BACKGROUND OF THE INVENTION

1. Field of the Invention

The present invention relates to a weighing system, and in particular to a calibration device for a weighing system.

2. The Related Art

In the prior art, the calibration of a weighing system for large- and medium-sized tanks has been a problem that has bothered users for many years. It is well known that calibration with certified test weights is the most accurate calibration method that is most widely accepted by the people with knowledge of weighing, but in practical applications, the operation is extremely difficult.

However, for many of the existing tanks of several tons to hundreds of tons, it is impossible to find a place to hang weights on the tank, and the handling of the weights is time-consuming and laborious. It is therefore almost impossible to calibrate these weighing systems with test weights, even if that amount of test weights were available. People then also come up with methods such as material substitution and material transfer, which are not only time-consuming and laborious, but also costly and inaccurate.

In recent years, some people have tried to use hydraulic calibration methods, but these methods still have some defects, or are not accepted in practice, have too many limitations, and are thus not practically applied in the market. Like the apparatus for checking and/or calibrating a weighing device for a container, GB 2 027 542 A, includes means for pushing or pulling the container against the restraint exerted thereon by the weighing device and incorporating in said means at least one force measuring transducer having energizing means and output signal means, said output signal means being utilized to indicate the load applied to the container by the pushing or pulling means. A hydraulic compression cylinder supplied by a pump is connected between two members so that the cylinder causes contraction of means for pushing or pulling the container. Means for connecting to the container comprises turnbuckles in series with adjustable length chains. Means are provided for reversing the signal from the transducer, so that it can be incorporated in connecting means between framework and the top of container to measure compression.

In view of this, a person skilled in the art urgently needs to develop a new calibration device for a weighing system.

SUMMARY

The technical problem to be solved by the present invention is to overcome the current deficiencies such as time-consuming and laborious calibration methods and high costs of weighing system calibration for existing large- and medium-sized tanks, and thus provide a practical calibration device for weighing systems.

The above-mentioned technical problem is solved in the present invention by the following technical solutions:

A calibration device for a weighing system, the weighing system comprising a tank, with a plurality of support legs being provided at a lower part of the tank, the calibration device comprising at least one calibration module, a hydraulic system and a calibration terminal; wherein an upper end of the calibration module is fixedly connected to an upper part of the corresponding support leg, and a lower end of the calibration module is fixedly connected to the foundation; the calibration module is connected via a hose to the hydraulic system for applying a force to the tank; and the calibration terminal is connected to the calibration module for displaying, in real-time, the force applied to the tank.

According to one embodiment of the present invention, the calibration module further comprises a calibration load cell for converting the applied force from the calibration module into an analogue signal, and the calibration device further comprises at least one A/D-converter for converting the analogue signal from the calibration load cell into a digital signal, wherein for each calibration load cell, a A/D-converter is located at the calibration terminal for converting the analogue signal and providing a digital output signal for processing at the calibration terminal, or wherein for each calibration load cell, a A/D-converter is located at the calibration load cell for converting the analogue signal and providing a digital output signal for processing at the calibration terminal, or wherein the calibration device further comprises a smart junction box having an A/D-converter for each calibration load cell and providing a digital output signal per calibration load cell for processing at the calibration terminal.

According to one embodiment of the present invention, the hydraulic system comprises a pump, a pressure gauge, a manifold, a number of hoses, a number of one-way stop valves, a a number of hydraulic cylinders and a number of quick-change connectors, wherein one side of the manifold is connected to the corresponding hydraulic cylinder via some of the hoses, and each of the one-way stop valves are mounted to the corresponding hosees and close to the hydraulic cylinders; and wherein the other side of the manifold is connected to one end of the pressure gauge, and the other end of the pressure gauge is connected to the pump.

According to one embodiment of the present invention, the hoses are high-pressure flexible hoses.

According to one embodiment of the present invention, the hydraulic cylinder is a pull-type hydraulic cylinder.

According to one embodiment of the present invention, the pump is a manual pump or an electric pump.

According to one embodiment of the present invention, the calibration module comprises a plurality of U-clevises, a plurality of rod ends, a coupling nut, a threaded rod, a calibration load cell and a pull-type hydraulic cylinder; wherein the lower end of the calibration load cell is connected to the rod of the pull-type hydraulic cylinder, the U-clevis and the rod end in succession; and wherein the upper end of the calibration load cell is connected to the threaded rod, the coupling nut, the rod end and the U-clevis in succession.

According to one embodiment of the present invention, lifting lugs are arranged at the top of the support legs or support brackets, and the U-clevises are fixedly connected to the corresponding lifting lugs.

According to one embodiment of the present invention, the bottom ends of the support legs or support brackets are supported by a solid foundation, a mezzanine floor or steel structure via anchor plates, and the rod ends are fixed to the anchor plates.

According to one embodiment of the present invention, one, two, three or four calibration modules are provided.

According to one embodiment of the present invention, a pull-type calibration load cell is connected in series with a pull-type hydraulic cylinder, and is used to display, in real time, a tension load value generated by the pull-type hydraulic cylinder, via the calibration terminal.

A calibration device for a weighing system, the weighing system comprising a tank, with a plurality of support legs or support brackets being provided to mount the tank on a solid foundation, a mezzanine floor or a steel structure; wherein the calibration device comprising at least one calibration module for applying a force to the tank fixedly connected at the upper end of the calibration module to one of each support leg or support bracket, and fixedly connected at the lower end of the calibration module to the solid foundation, the mezzanine floor or the steel structure, the calibration module comprising a calibration load cell for converting the applied force from the calibration module into an analogue signal; the calibration device further comprising a calibration terminal for processing the analogue signal of the calibration load cell and displaying, in real time, the applied force from the calibration module; and at least one A/D-converter for converting the analogue signal from the calibration load cell into a digital signal. The solution is characterized in that for each calibration load cell, a A/D-converter is located at the calibration terminal for converting the analogue signal and providing a digital output signal for processing at the calibration terminal, or in that for each calibration load cell, a A/D-converter is located at the calibration load cell for converting the analogue signal and providing a digital output signal for processing at the calibration terminal, or in that the calibration device further comprises a smart junction box having an A/D-converter for each calibration load cell and providing a digital output signal per calibration load cell for processing at the calibration terminal.

The positive progress effects of the present invention lie in: the calibration device for a weighing system of the present invention can greatly improve the production efficiency, and in use, it takes only two hours to complete the calibration, which is far better than the test weight and other calibration methods. The uncertainty of the calibration process can reach 0.1% or better.

BRIEF DESCRIPTION OF THE DRAWINGS

The above-mentioned and other features, properties and advantages of the present invention will become more apparent from the following description of the embodiments with reference to the accompanying drawings, and the same reference numerals in the figures denote the same features throughout the drawings, in which:

FIG. 1 is a reference diagram of a service state of a calibration device for a weighing system of the present invention.

FIG. 2 is a front view of a calibration module in the calibration device for a weighing system of the present invention.

FIG. 3 is a side view of the calibration module in the calibration device for a weighing system of the present invention.

FIG. 6 is a wiring connection scheme in a calibration device for a weighing system of the prior art.

FIG. 7 is a first wiring connection scheme in the calibration device for a weighing system of the present invention.

FIG. 8 is a second wiring connection scheme in the calibration device for a weighing system of the present invention.

FIG. 9 is a third wiring connection scheme in the calibration device for a weighing system of the present invention.

DETAILED DESCRIPTION OF EMBODIMENTS

Figure 4:
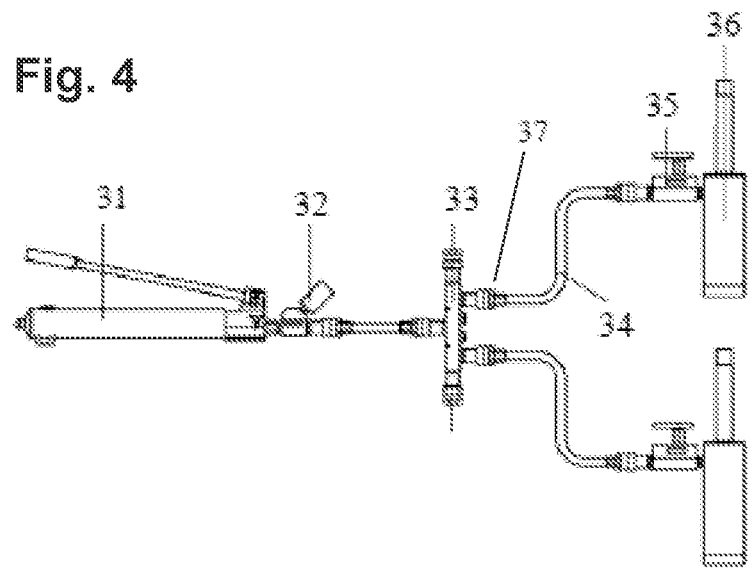
FIG. 4 is a schematic structural diagram of a hydraulic system in the calibration device for a weighing system of the present invention.

To make the above objects, features and advantages of the present invention more obvious and easier to understand, the present invention will be described in detail below in conjunction with the accompanying drawings and particular embodiments.

Embodiments of the present invention will now be described in detail with reference to the accompanying drawings. Reference will now be made in detail to preferred embodiments of the present invention, examples of which are illustrated in the accompanying drawings. The same reference numerals used in all the figures denote identical or similar parts wherever possible.

Furthermore, although the terms used in the present invention are selected from well-known common terms, some of the terms mentioned in the description of the present invention may have been selected by the applicant according to his or her judgement, and the detailed meaning thereof is described in the relevant section described herein.

Furthermore, the present invention must be understood, not simply by the actual terms used but also by the meanings encompassed by each term.

Figure 5:
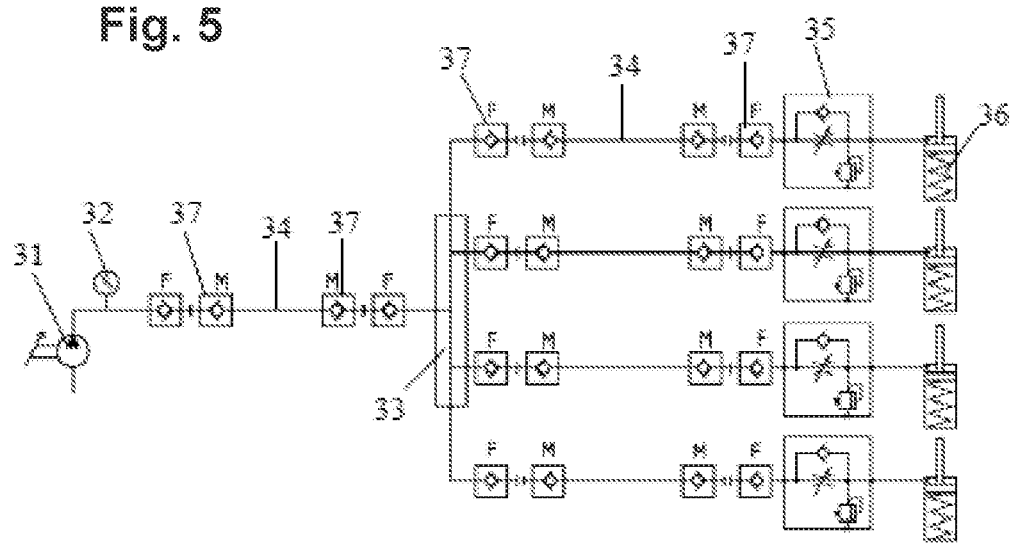
FIG. 5 is a principle diagram of the hydraulic system in the calibration device for a weighing system of the present invention.

FIG. 1 is a reference diagram of a calibration device for a weighing system of the present invention in a service state. FIG. 2 is a front view of a calibration module in the calibration device for a weighing system of the present invention. FIG. 3 is a side view of the calibration module in the calibration device for a weighing system of the present invention. FIG. 4 is a schematic structural diagram of a hydraulic system in the calibration device for a weighing system of the present invention. FIG. 5 is a diagram of the principle of the hydraulic system in the calibration device for a weighing system of the present invention.

As shown in FIGS. 1 to 5, the present invention discloses a calibration device for a weighing system, the weighing system comprising a tank 10, with a plurality of support legs 11 being provided at a lower part of the tank 10, and the calibration device comprising a number of calibration modules 20, a hydraulic system 30 and a calibration terminal 40. An upper end of the calibration module 20 is fixedly connected to an upper part of the corresponding support leg 11, and a lower end of the calibration module 20 is fixedly connected to the foundation. The calibration modules 20 are connected to the hydraulic system 30 via a number of hoses 34. The calibration terminal 40 is connected to the hydraulic system 30 for real-time display of load distribution applied to the tank 10.

From the above, the hydraulic system 30 comprises a pump 31, a pressure gauge 32, a manifold 33, a number of hoses 34, a number of one-way stop valves 35, a hydraulic cylinder 36 and a quick-change connector 37, one side of the manifold 33 being connected to the corresponding hydraulic cylinder 36 via a number of hoses 34, and the one-way stop valve 35 being mounted to the corresponding hose 34 close to the hydraulic cylinder 36. The other side of the manifold 33 is connected to one end of the pressure gauge 32, and the other end of the pressure gauge 32 is connected to the pump 31 via the quick-change connector 37. The one-way stop valve 35 is directly mounted to an input and output port of the hydraulic cylinder 36, and quick-change connectors 37 are mounted at all joints of the hoses 34.

Specifically, the hose 34 is preferably a high-pressure flexible hose. The hydraulic cylinder 36 is preferably a pull-type or tension hydraulic cylinder. The pump 31 is preferably a manual pump or an electric pump.

Further, the calibration module 20 comprises a plurality of U-clevises 21, a plurality of rod ends 22, a coupling nut 23, a threaded rod 24, a calibration load cell 25 and a pull-type hydraulic cylinder 26. The lower end of the calibration load cell 25, is connected to the rod of the pull-type hydraulic cylinder 26, the U-clevis 21 and the rod end 22 in succession. In addition, the upper end of the calibration load cell 25, is connected to the threaded rod 24 is connected to the coupling nut 23, the rod end 22 and the U-clevis 21 in succession.

In the implementation process, the upper end of the calibration module 20 is connected to the tank 10, and the lower end of the calibration module 20 is connected to the foundation. If the target tank is to reach the calibration precision of 0.1%, the load cell used should at least meet the precision requirement of 0.03%.

According to the above structure, the calibration module 20 is installed to the tank 10 by: arranging lifting lugs 12 at the top of the support legs 11 of the tank 10, and fixedly connecting the U-clevis 21 of the calibration module 20 to the corresponding lifting lugs 12. The bottom of the support legs 11 are fixed to the foundation via anchor plates 13, and the rod ends 22 of the calibration modules 20 are fixed to the anchor plates 13.

Preferably, one, two, three or four calibration modules 20 in this embodiment can be preferably provided.

Furthermore, a pull-type load cell (not referred in FIG. 1) is connected in series on the pull-type hydraulic cylinder 26, and is used to display a tension value generated by the pull-type hydraulic cylinder 26 on the calibration terminal 40 in real time.

As described above for the structure, a tank weighing system with four weigh modules is taken as an example in this embodiment, but can be applied to any industrial weighing system such as hopper, bin, silo or reactor vessel supported on one or more load cells or weigh modules. In particular, four lifting lugs 12 are arranged on the tank 10 according to the proposal of MT hydraulic calibration, the anchor plates 13 are pre-embedded on the foundation, and a number of hoses can be connected around the tank 10.

The calibration modules can also be connected to the tank in many different ways, e.g. if the lugs are welded to the body of the tank, or the threaded rod 20 can connect directly to a tank's mounting brackets in a through-floor situation. The calibration modules can also connect to the tank foundation in many different ways, e.g., a lug can be welded to the foundation, especially when this is a steel structure. Only one connection point on the tank and one connection point on a solid foundation that is required for each calibration module to apply the calibration force to the tank.

In FIGS. 6 to 9 the electrical cabling of the calibration device is shown. FIG. 6 represents the cabling according to the prior art. The analogue junction box 12 sums the analog signals from the calibration load cells 25 by the analogue summing board 13 and provides an average summed analogue signal to the terminal 20 via analogue home-run cable 14. Before further processing on the motherboard 45, an analogue-to-digital conversion is made by the A/D converter 42.

In one embodiment of the current inventive solution, each analogue calibration load cell 25 is connected to its own A/D converter 42 within the terminal 20 (FIG. 7). The A/D converters provide digital weight information for each calibration load cell to the terminal 20 which then does further processing of the digital signals on the motherboard 45, e.g. summing the signals for determining the total applied force.

In a further embodiment of the current inventive solution, as shown in FIG. 8, a so-called smart junction box 43 as an alternative to that shown in FIG. 7 is interposed between the analogue calibration load cells 25 and the terminal 20. Each analogue calibration load cell 25 is connected to its own A/D converter 42 located inside the smart junction box 43. The digital weight information for each calibration load cell 25 remains separate and all are provided over a digital communications cable 44 to the terminal 20 which then does the further processing.

In another embodiment of the current inventive solution is shown in FIG. 9. Each analogue calibration load cell 25 has its own A/D converter 42 located inside its enclosure, becoming a digital calibration load cell 25'. The digital weight information for each digital calibration load cell 25 remains separate and all are provided over a digital communications cable 44 typically connected in a daisy-chain arrangement as shown, although other connection topologies are possible. The terminal 20 receives individual load cell weight information and does the further processing.

The calibration device for a weighing system of the present invention can be temporarily assembled onto a tank to complete the calibration, and is mainly composed of a calibration module, a calibration terminal and a manual pump. Herein, one, two, three or four calibration modules can be used according to actual requirements. The pull-type hydraulic cylinder is used to generate a predetermined tension force, which is applied to each leg of the tank, and the pull-type load cell is connected in series with the pull-type hydraulic cylinder for real-time display of the tension force(s) to the calibration terminal. The hydraulic system is connected to the required number of calibration modules 20 through the manifold 33, which can ensure that the oil pressures in the calibration modules are roughly equal, thus ensuring equal force applied through each calibration module on the tank 10. The calibration terminal 40 is a multi-channel device, and can display a combined force value applied to the tank 10 in real time and can display the force value of each calibration module, so as to monitor load distribution on the tank weighing system (being the same as the principle of using a digital load cell). Finally, the force value displayed by the calibration terminal 40 is used to calibrate the tank weighing system. This method is simple and rapid and is suitable for large-scale promotion.

It thus can be seen that the characteristics of the calibrating device for a weighing system of the present invention lie in: the hydraulic system with one manual pump whose output is split into 4 flows potentially through the manifold and loads simultaneously the hydraulic cylinders, which ensures that all the scale lugs are loaded synchronously and uniformly; as the one-way stop valve is used and is integrated with an overflow valve, the system can achieve multi-point calibration of a tank scale, and safety in case of extreme overloading is ensured; quick-change connectors are used at all joints of the hydraulic system to ensure convenient and quick field operation; and in the calibration system, the calibration terminal can automatically load the operating software, which can control the functions of calibration, data collection and processing, and security monitoring. With the above calibration device, 2-point, 3-point, 4-point, 5-point and 11-point calibrations and adjustments can be performed.

In summary, the calibration device for a weighing system of the present invention can greatly improve the production efficiency. In use, it takes only two hours to complete the calibration, which is far better than the test weight and other calibration methods. The uncertainty of the calibration process can reach 0.1% or better.

While particular embodiments of the present invention have been described above, a person skilled in the art should understand that these are merely illustrative, and that the scope of protection of the present invention is defined by the appended claims. Various alterations or modifications to these embodiments can be made by a person skilled in the art without departing from the principle and essence of the present invention; however, these alterations and modifications all fall within the scope of protection of the present invention.

REFERENCE LIST

10 Tank
11 Support leg
20 Calibration module
30 Hydraulic system
40 Calibration terminal
31 Pump
32 Pressure gauge
33 Manifold
34 Hose
35 One-way stop valve
36, 26 Hydraulic cylinder
37 Quick-change connector
21 U-clevis
22 Rod end
23 Coupling nut
24 Threaded rod
25 Calibration load cell
25' Digital calibration load cell
12 Analogue junction box
13 Analogue summing board
14 Analogue home-run cable
41 Analogue signal cables
42 A/D converter
43 Smart junction box
44 Digital communications cable
45 Motherboard

What is claimed is:

1. A device for calibrating a weighing system, the weighing system comprising a tank having, at a lower portion, a plurality of support legs, the calibration device comprising:
   at least one calibration module, such that each calibration module is adapted at an upper end for fixed connection to an upper part of a corresponding one of the support legs and a lower end is adapted for fixed connection to a foundation;
   a hydraulic system connected by a hose to each calibration module for applying a force to the tank;
   a calibration terminal, connected to each of the at least one calibration modules for real time display of the force applied to the tank;
   a calibration load cell in each calibration module for converting the applied force from the calibration module into an analog signal; and
   at least one analog-to-digital ("A/D") converter for converting the analog signal into a digital output signal;
   wherein, for each calibration load cell, a corresponding:
      one of the A/D converters is located at the calibration terminal for converting the analog signal and providing a digital output signal for processing at the calibration terminal;
      one of the A/D converters is located at the calibration load cell for converting the analog signal and providing a digital output signal for processing at the calibration terminal; or
      smart junction box is provided, having an A/D converter for each calibration load cell, for converting the analog signal received therefrom and providing a digital output signal per calibration load cell for processing at the calibration terminal.

2. The device of claim 1, wherein:
   the hydraulic system comprises:
      a pump;
      a pressure gauge;
      a manifold, having a first side and a second side, the first side being connected by way of the pressure gauge to the pump;
      a plurality of hoses,
      a plurality of one-way stop valves; and
      a plurality of hydraulic cylinders, each of the hydraulic cylinders connected to the second side of the manifold by way of a corresponding one of the hoses, with one of the one-way stop valves positioned between the hydraulic cylinder and the corresponding one of the hoses.

3. The device of claim 2, wherein each of the hoses is a high-pressure flexible hose.

4. The device of claim 2, wherein each of the hydraulic cylinders is a pull-type hydraulic cylinder.

5. The device of claim 2, wherein the pump is a manual pump or an electric pump.

6. The device of claim 1, further comprising:
   as a part of each calibration module, a plurality of U-clevises, a plurality of rod ends, a coupling nut, a threaded rod, a calibration load cell and a pull-type hydraulic cylinder, such that a lower end of the calibration load cell is connected, in succession, to the rod ends of the pull-type hydraulic cylinder, the U-clevis and the rod end, and an upper end of the calibration load cell is connected, in succession, to the threaded rod, the coupling nut, the rod end and the U-clevis.

7. The device of claim 6, further comprising:
   a plurality of lifting lugs are arranged at the top of the support legs, and the U-clevises are fixedly connected to the corresponding lifting lugs.

8. The device of claim 7, further comprising:
   a plurality of anchor plates wherein the bottom ends of the support legs or support brackets are supported by a solid foundation, a mezzanine floor or steel structure via anchor plates, and the rod ends are fixed to the anchor plates.

9. The device of claim 1, wherein up to four calibration modules are provided.

10. The device of claim 1, wherein a pull-type calibration load cell is connected in series with a pull-type hydraulic cylinder, and is used to display, in real time, a tension load value generated by the pull-type hydraulic cylinder, via the calibration terminal.

11. A calibration device for a weighing system having a tank, with a plurality of support legs or support brackets for the tank on a solid foundation, a mezzanine floor or a steel structure, the calibration device comprises:
- at least one calibration module for applying a force to the tank fixedly connected at an upper end of the calibration module to one of each support leg or support bracket, and fixedly connected at a lower end of the calibration module to the solid foundation, mezzanine floor or steel structure, each calibration module comprising a calibration load cell for converting a force applied from the calibration module into an analog signal;
- a calibration terminal for processing the analog signal and displaying, in real time, the applied force from the calibration module; and
- at least one analog-to-digital ("A/D") converter for converting the analog signal into a digital signal, wherein one of the following applies:
  - for each calibration load cell, a corresponding one of the A/D-converters is located at the calibration terminal for converting the analog signal and providing a digital output signal for processing at the calibration terminal, or
  - for each calibration load cell, a corresponding one of the A/D-converters is located at the calibration load cell for converting the analog signal and providing a digital output signal for processing at the calibration terminal, or
  - a smart junction box is provided, having an A/D-converter for each calibration load cell for converting the analog signal received therefrom and providing a digital output signal per calibration load cell for processing at the calibration terminal.

* * * * *